United States Patent
Pellerin (10) Patent No.: US 12,000,495 B2
(45) Date of Patent: Jun. 4, 2024

(54) PRESSURE REFERENCED VALVE

(71) Applicant: PRATT & WHITNEY CANADA CORP., Longueuil (CA)

(72) Inventor: Hugues Pellerin, Montréal (CA)

(73) Assignee: PRATT & WHITNEY CANADA CORP., Longueuil (CA)

( * ) Notice: Subject to any disclaimer, the term of this patent is extended or adjusted under 35 U.S.C. 154(b) by 0 days.

(21) Appl. No.: 17/380,573

(22) Filed: Jul. 20, 2021

(65) Prior Publication Data
US 2023/0027703 A1 Jan. 26, 2023

(51) Int. Cl.
*F16K 17/06* (2006.01)
*F16K 1/12* (2006.01)

(52) U.S. Cl.
CPC ............ *F16K 17/065* (2013.01); *F16K 1/126* (2013.01); *Y10T 137/3367* (2015.04)

(58) Field of Classification Search
CPC ... F16K 17/065; F16K 1/126; Y10T 137/3367
See application file for complete search history.

(56) References Cited

U.S. PATENT DOCUMENTS

| | | | | |
|---|---|---|---|---|
| 2,938,533 A | * | 5/1960 | Jensen | F16K 1/126 137/219 |
| 3,260,275 A | * | 7/1966 | Armstrong | G05D 16/106 251/63 |
| 3,650,289 A | * | 3/1972 | Locke | F16K 17/10 137/219 |
| 3,836,115 A | * | 9/1974 | Zell | F16K 27/00 251/150 |
| 4,285,495 A | * | 8/1981 | King | F16K 1/126 137/219 |
| 4,479,507 A | * | 10/1984 | Nichols | B67D 7/301 137/220 |
| 4,520,843 A | | 6/1985 | Debrunner, Jr. | |
| 5,462,081 A | | 10/1995 | Perusek et al. | |
| 5,509,787 A | * | 4/1996 | Valdes | F04B 11/0016 200/81.9 R |
| 2016/0237915 A1 | * | 8/2016 | Villanueva | F16K 1/12 |
| 2018/0231128 A1 | * | 8/2018 | Villanueva | G05D 16/106 |

FOREIGN PATENT DOCUMENTS

| | | |
|---|---|---|
| EP | 3626942 | 3/2020 |
| FR | 2871212 | 12/2005 |

\* cited by examiner

*Primary Examiner* — Robert K Arundale
(74) *Attorney, Agent, or Firm* — NORTON ROSE FULBRIGHT CANADA LLP (57) ABSTRACT

A referenced pressure valve for a fluid system having a housing including: an inner wall enclosing a cavity providing fluid communication between the inlet and the outlet; a rim in the cavity defining a bypass passage circumscribed outwardly by the inner wall and inwardly by the rim, an upstream passage located between an upstream end of the cavity and the rim, and a downstream passage located between the rim and a downstream end of the cavity. A rib extends outwardly from the rim to the inner wall through the bypass passage, and a piston assembly, received within a chamber circumscribed outwardly by the rim, includes a piston movable relative to the rim between a position in which the piston obstructs the flow path at the upstream passage and a position in which the piston is at least partially clear of the path to permit flow along the path.

15 Claims, 11 Drawing Sheets

PRESSURE REFERENCED VALVE

TECHNICAL FIELD

This disclosure relates generally to fluid systems and valves therefore, and more particularly to pressure referenced valves for use in, for example, an oil system of a gas turbine engine or the like.

BACKGROUND

Various valves are used for controlling and/or selectively permitting fluid flow between a source and a wet component, for example check valves which are used to open or close an oil path from a reservoir to a bearing in a gearbox. The opening and closing of such check valves can be triggered by various mechanisms. While existing valves may suit their intended purpose, there remains room for improvement in the art, for instance where space, weight and/or part count pertaining to such valves are design concerns.

SUMMARY

In an aspect of the present technology, there is provided a valve for use in a fluid system, the valve comprising: a housing having an inlet passage, an outlet passage spaced axially spaced apart from the inlet passage relative to a longitudinal axis extending through the housing, and a pressure reference port located axially between the inlet passage and the outlet passage, the housing including: an inner-housing wall enclosing a housing cavity providing fluid communication between the inlet passage and the outlet passage; a rim in the housing cavity extending circumferentially about the longitudinal axis, the rim defining an axially-extending bypass passage circumscribed radially outwardly by the inner-housing wall and radially inwardly by the rim, a radially-extending upstream passage located axially between an upstream end of the housing cavity and the rim, and a radially-extending downstream passage located axially between the rim and a downstream end of the housing cavity, wherein the inlet passage, the upstream passage, the bypass passage, the downstream passage and the outlet passage are in serial flow communication so as to define a flow path through the valve; a chamber circumscribed radially outwardly by the rim, the chamber in fluid communication with the pressure reference port; a rib extending radially outwardly from the rim to the inner-housing wall, through the bypass passage; and a piston assembly received within the chamber, the piston assembly including a piston movable axially relative to the rim between a first valve position in which the piston obstructs the flow path at the upstream passage and a second valve position in which the piston is at least partially clear of the flow path to permit fluid flow along the flow path.

In another aspect, there is provided a fluid system for a gas turbine engine, the fluid system comprising: a reservoir for receiving a fluid; a valve downstream of the reservoir and having a valve inlet in fluid communication therewith, the valve including: a housing including: an inlet passage defining the valve inlet, an outlet passage spaced axially spaced from the inlet passage relative to a longitudinal axis extending through the housing, and a pressure reference port located axially between the inlet passage and the inlet passage, the outlet passage defining a valve outlet; an axially-extending bypass passage radially outward of the longitudinal axis; a radially-extending upstream passage in fluid communication between the inlet passage and an upstream end of the bypass passage; a radially-extending downstream passage in fluid communication between a downstream end of the bypass passage and the outlet passage, wherein the inlet passage, the upstream passage, the bypass passage, the downstream passage and the outlet passage are in serial flow communication so as to define a flow path through the valve, and a chamber extending axially between the upstream passage and the downstream passage, the chamber in fluid communication with the pressure reference port; a piston assembly received by the chamber, the piston assembly including a piston movable axially relative to the chamber between a first valve position in which the piston obstructs the flow path at the upstream passage and a second valve position in which the piston is at least partially clear of the flow path to permit fluid flow along the flow path; and a wet cavity downstream of the valve and in fluid flow communication with the valve outlet.

BRIEF DESCRIPTION OF THE DRAWINGS

Reference is now made to the accompanying figures in which.

DETAILED DESCRIPTION

Figure 1:
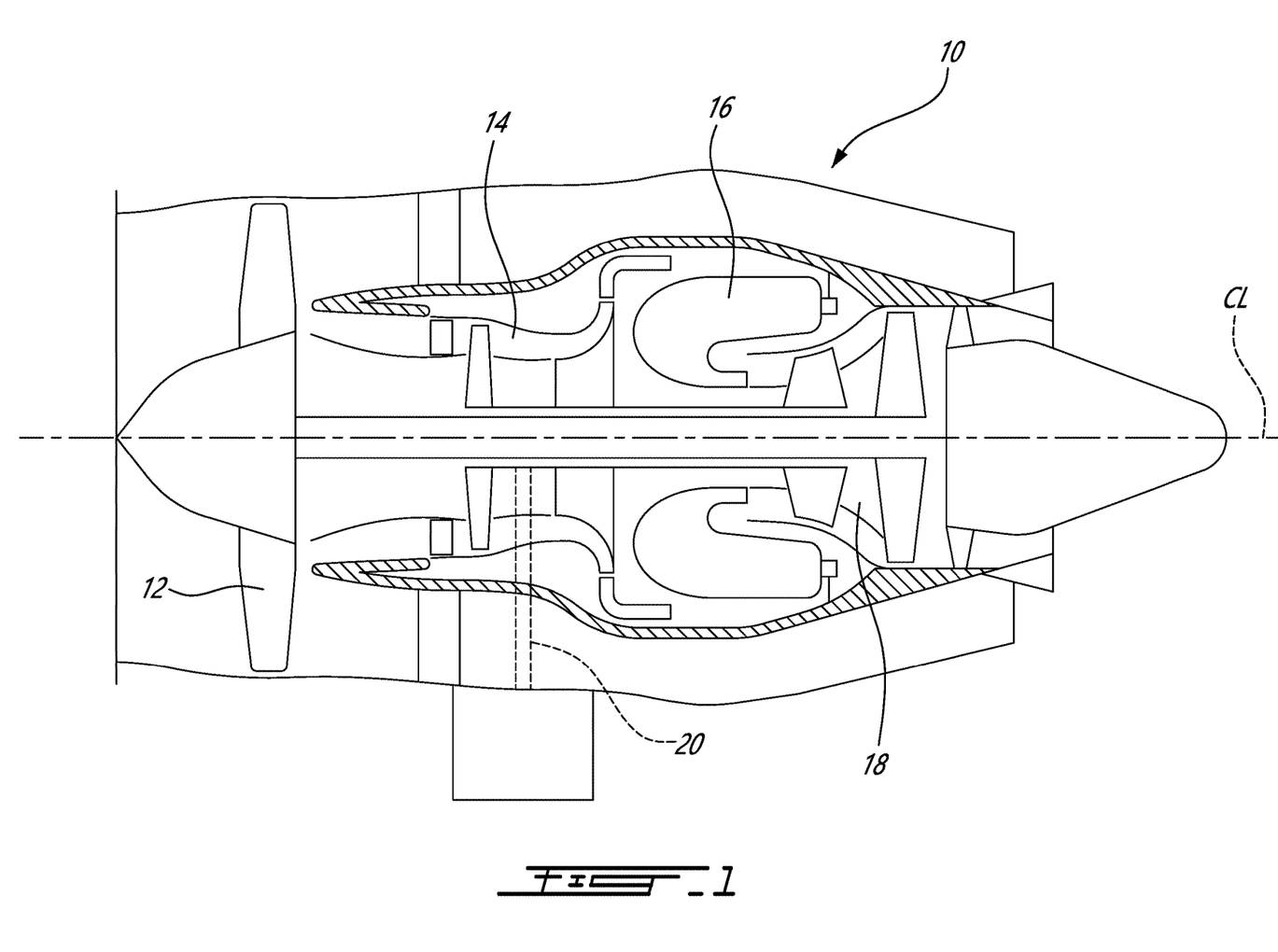
FIG. 1 is a schematic cross sectional view of a gas turbine engine.

FIG. 1 illustrates an aircraft engine 10 of a type preferably provided for use in subsonic flight, such as for example a gas turbine engine generally comprising in serial flow communication a fan 12 through which ambient air is propelled, a compressor section 14 for pressurizing the air, a combustor 16 in which the compressed air is mixed with fuel and ignited for generating an annular stream of hot combustion gases, and a turbine section 18 for extracting energy from the combustion gases.

Although the present technology will generally be described in an exemplary manner with respect to an oil system 20 of the engine 10, it shall be understood that it may also be implemented, mutatis mutandis, in any other fluid system of the engine 10, such as for example a fuel system. Additionally, the valves as described herein may also be implemented in other types of fluid systems.

Figure 2:
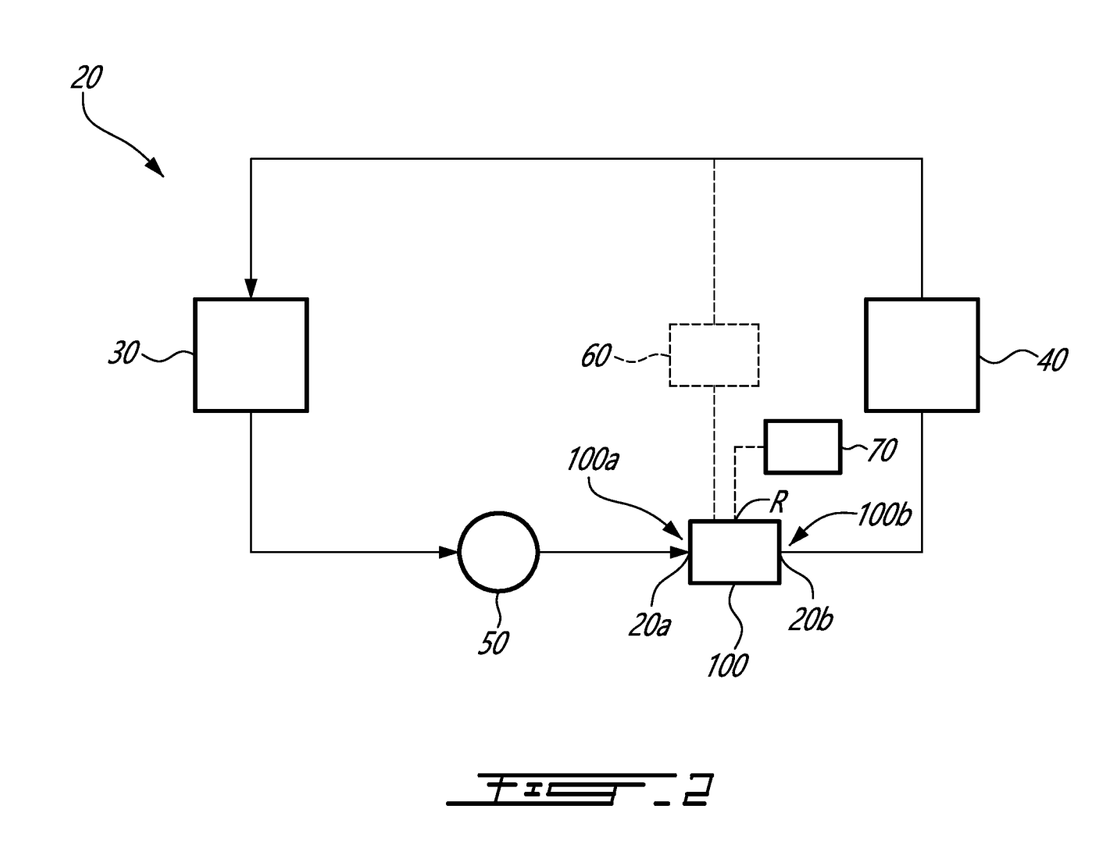
FIG. 2 is a schematic representation of a fluid system of the gas turbine engine of FIG. 1.

FIG. 2 illustrates an oil system 20 for the engine 10, comprising a reservoir 30, a wet cavity 40 downstream of the reservoir 30, a pump 50 in fluid communication between the reservoir 30 and the wet cavity 40 and a valve 100 in fluid communication between the pump 50 and the wet cavity 40. The valve 100 is also in fluid communication with a return line 60, itself in fluid communication with the reservoir 50, via which the valve 100 may drain, for example upon the engine 10 shutting down.

The valve 100 and others described herein are so-called "pressure referenced" valve (or simply "referenced" valve), and thus is actuated to open or close based on, or in reference to, a pressure reference schematically shown at 70, for example a sensed fluid pressure somewhere in the fluid system. Indeed, a referenced valve may be configured to open when the pressure of the fluid at a certain point in the fluid system (not necessarily on either side of the valve itself) reaches a threshold pressure value. The pressure reference 70 can in some cases be located at the reservoir 30 or at the wet cavity 40. Suitable locations for the pressure reference 70 within the fluid system include a fluid tank, a bearing cavity, and a gearbox, among others. Nevertheless, the pressure reference 70 can also be external to the fluid system, and may be located for example in the main gas path of the engine 10 at the compressor section 14. Various other suitable locations for the pressure reference 70 are also possible, depending on the implementation of the valve 100. The pressure reference 70 may be a location at which the pressure is the lowest of any location of the fluid system, which may minimize a pressure drop of the fluid flowing across the valve 100.

The valve 100 therefore has a pressure reference port R in fluid communication with the pressure reference 70, and is configured to operate (i.e., open or close) as a function of system pressures exerted onto the valve 100 such as a pressure exerted by the pump 50 and a pressure exerted by the pressure reference 70 via the reference port R.

Figure 3:
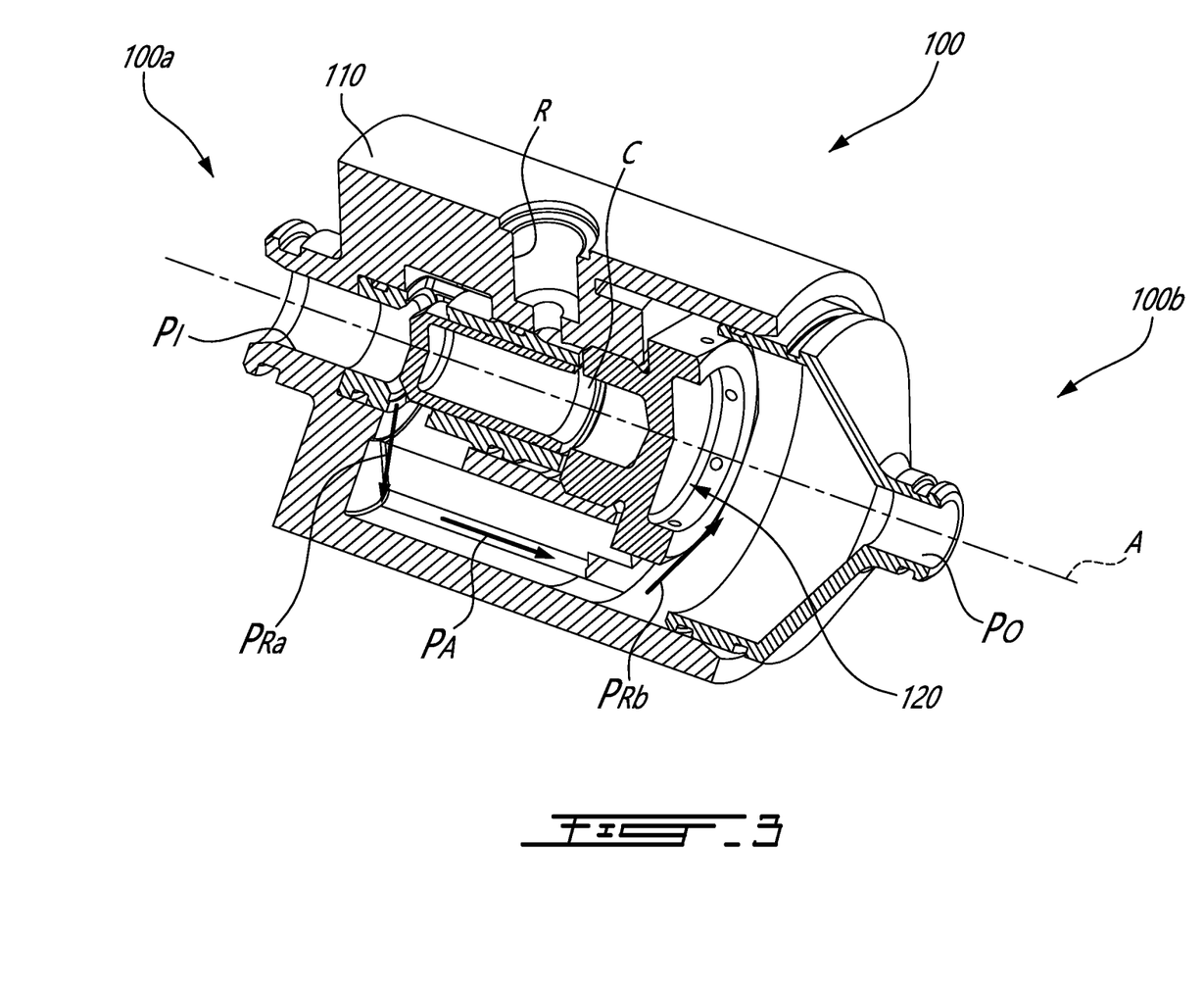
FIG. 3 is a cutaway, partially sectioned, perspective view of a valve of the fluid system of FIG. 2, with a spring of the valve having been removed for clarity.

With reference to FIGS. 3 to 6, the valve 100 will be described in greater detail. As illustrated in FIG. 3, the valve 100 includes a housing 110 having an upstream end $100_a$ of the valve 100 defining an inlet passage $P_I$, or inlet port, and a downstream end $100_b$ of the valve 100 defining an outlet passage $P_O$, or outlet port. In this embodiment, the housing 110 has a cylindrical shape and extends along a longitudinal axis A that extends through the valve 100. The upstream and downstream ends $100_a$, $100_b$ project from opposite ends of the housing 110 in opposite directions parallel to the axis A, defining spouts sealingly receivable by fluid conduits 20a, 20b (FIGS. 2, 10A, 10B) of the oil system 20 respectively located upstream and downstream of the valve 100. In certain other embodiments, the upstream and downstream ends $100_a$, $100_b$ are arranged for sealingly receiving the fluid conduits 20a, 20b. In yet other embodiments, the housing 110 is embedded in another housing-type structure of the oil system 20 (for example an oil pump housing, an oil tank housing, a bearing cavity housing, a gearbox cavity housing, etc.) defining either conduit 20a, 20b, and may be said to form a unitary piece therewith.

On the inside, the housing 110 defines a chamber C along the axis A having an upstream end in fluid communication with the inlet passage $P_I$ and a downstream end in fluid communication with the outlet passage $P_O$. The reference port R of the valve 100 is defined by the housing 110 and is in fluid communication with inside the chamber C. A piston assembly 120 of the valve 100 is sealingly received by the chamber C so as to close the chamber C at either end. The piston assembly 120, as will be described, is structured and arranged so as to be clear of a portion of the chamber C that is in fluid communication with the reference port R. Radially outward of the chamber C relative to the axis A, the housing 110 defines an axially-extending passage referred to as a bypass passage $P_A$. The bypass passage $P_A$ extends besides the chamber C away from the upstream end $100_a$ and toward the downstream end $100_b$. Upstream of the chamber C, the housing 110 defines a radially-extending upstream passage $P_{Ra}$ extending from the inlet passage $P_I$ to an upstream end of the bypass passage $P_A$. Downstream of the chamber C, the housing 110 defines a radially-extending downstream passage $P_{Rb}$ extending from a downstream end of the bypass passage $P_A$ to the outlet passage $P_O$. The inlet passage $P_I$, the upstream passage $P_{Ra}$, the bypass passage $P_A$, the downstream passage $P_{Rb}$ and the outlet passage $P_O$ are in serial flow communication so as to define a flow path through the valve 100. The flow path may be said to be routed through the valve 100 so as to circumvent the chamber C and the reference port R as it extends from the upstream end $100_a$ to the downstream end $100_b$ of the valve 100. The piston assembly 120 is arranged relatively to the housing 110 so as to selectively obstruct the flow path at the upstream passage $P_{Ra}$, as will be described hereinbelow.

Figure 4A:
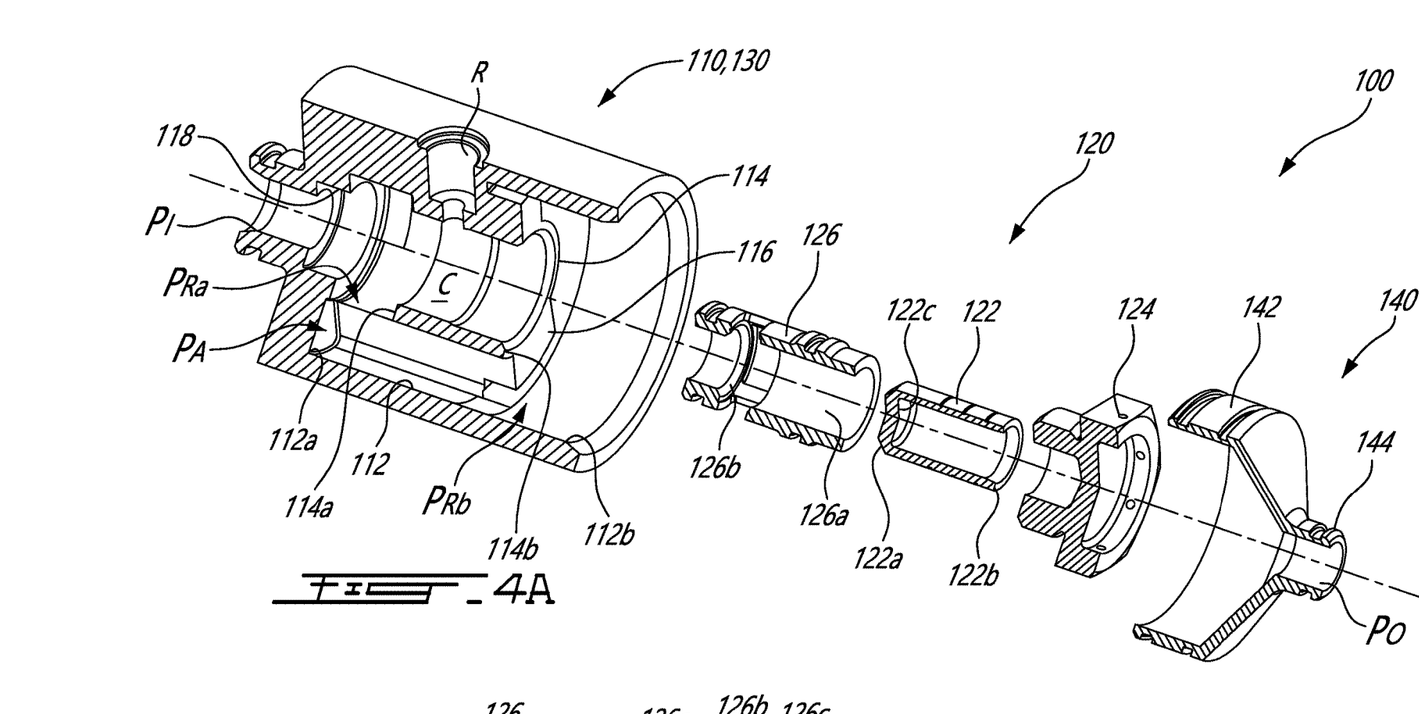
FIG. 4A is an exploded view of the valve of FIG. 3.

In FIG. 4A, the valve 100 is shown disassembled and circumferentially cutaway so as to exhibit interior features. As shown in FIG. 4A, the housing 110 has an interior-housing wall 112 defining a housing cavity about the axis A in fluid communication between the inlet passage $P_I$ and the outlet passage $P_O$. The housing 110 also has a tubular rim 114 located in the housing cavity about the axis A. An exterior of the rim 114 defines the bypass passage $P_A$, whereas an interior of the rim 114 defines the chamber C. The bypass passage $P_A$ is circumscribed radially outwardly by the inner-housing wall 112 and radially inwardly by the rim 114 relative to the axis A. It shall be noted that in this embodiment, the rim 114 is axially shorter than the inner-housing wall 112. Moreover, an upstream end $112_a$ and a downstream end $112_b$ of the inner-housing wall 112 are respectively axially spaced outwardly from an upstream end $114_a$ and a downstream end $114_b$ of the rim 114, leaving portions of the bypass passage $P_A$ radially inwardly unenclosed at either end of the rim 114. This arrangement of the rim 114 relative to the inner-housing wall 112 defines portions of the upstream passage $P_{Ra}$ and the downstream passage $P_{Rb}$, which may also be referred to as housing windows defined by the housing 110 radially through the rim 114 on either side of the chamber C. In some embodiments, the rim 114 extends axially to either one or both of the ends $112_a$, $112_b$ of the inner-housing wall 112, and the housing windows are openings defined in a portion of the rim 114 surrounded by the inner-housing wall 112.

Figure 5A:
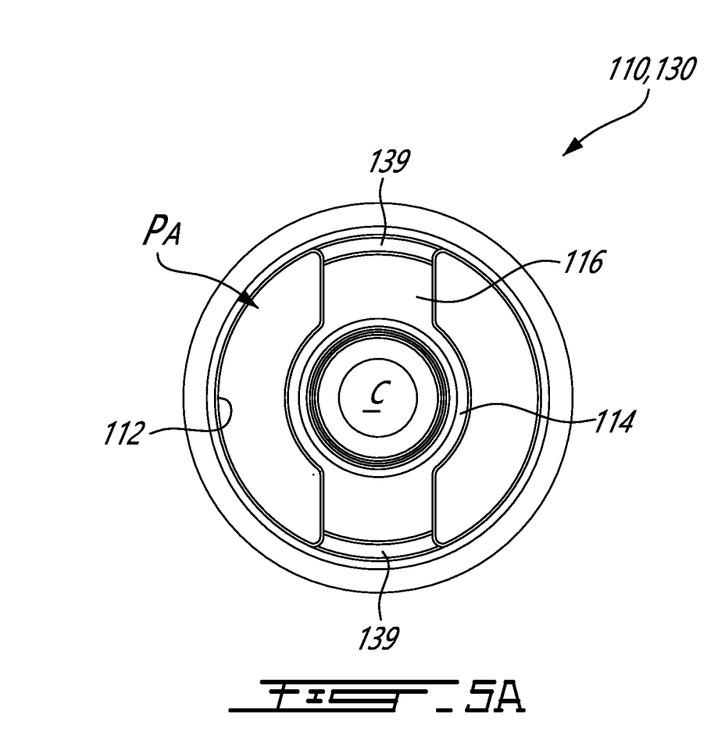
FIG. 5A is an end elevation view of a housing body of the valve of FIG. 3.
Figure 5B:
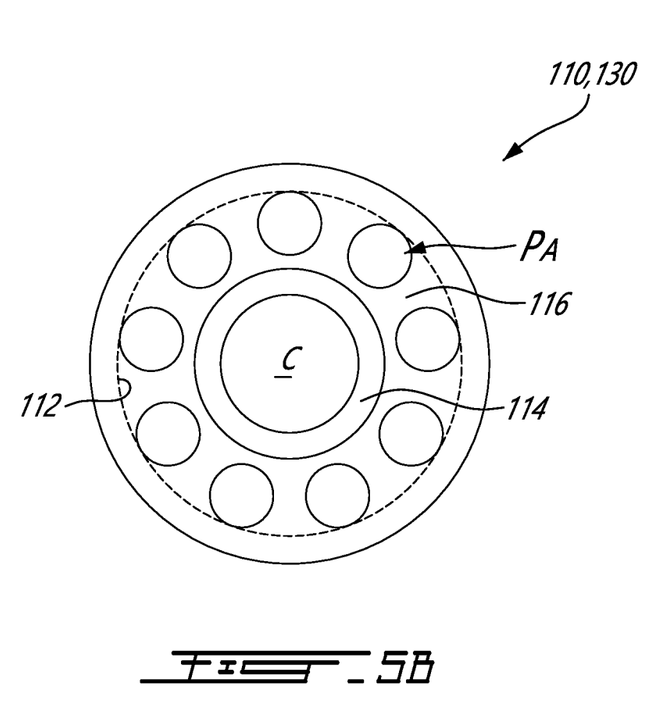
FIG. 5B is another end elevation view of a housing body of a valve of the fluid system of FIG. 2.

The housing 110 is also provided with at least one web-like member, henceforth referred to as a rib 116, which extends radially outwardly relative to the axis A from the rim 114 to the inner-housing wall 112. Depending on the embodiment, a plurality of ribs 116 being circumferentially spaced apart from one another can be provided. The plurality of ribs 116 partition the bypass passage $P_A$ into a plurality of axially-extending channels. For example, in this embodiment, two ribs 116 located diametrically opposite one another are provided (FIG. 5A) to support the rim 114 relative to the inner-housing wall 112, and define, together with the rim 114, a pair of C-shaped channels. In some embodiments, more than two channels are provided. In some embodiments, the channels have a cylindrical shape (FIG. 5B). The housing 110 also defines an annular housing seat 118 surrounding a downstream end of the inlet passage $P_I$, by way of which the housing 110 engages with the piston assembly 120 as will now be described.

Figure 4B:
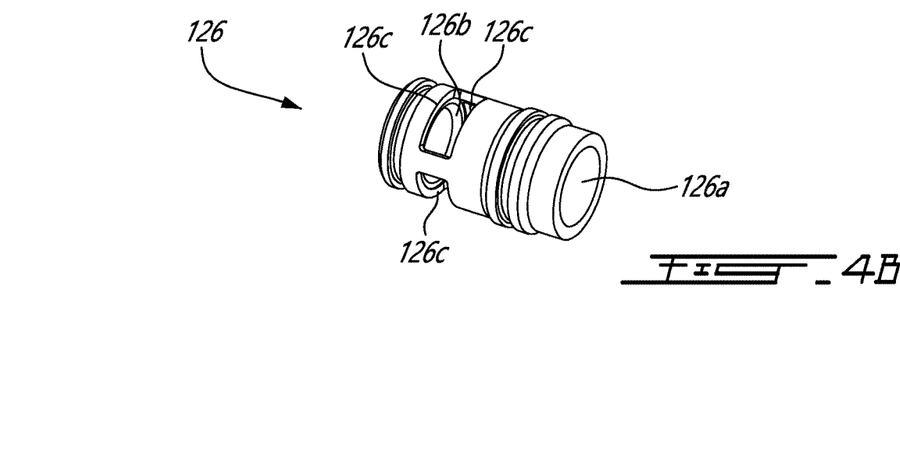
FIG. 4B is a perspective view of a sleeve of the valve of FIG. 3.

Still referring to FIG. 4A, the piston assembly 120 includes a piston 122, a base 124, a biasing means (not shown) between the piston 122 and the base 124 and a sleeve 126 by which the piston 122 is slidably received. A first sleeve end of the sleeve 126 is sealingly received by the housing seat 118 and a second sleeve end of the sleeve 126 is sealingly received by the rim 114 within the chamber C. The sleeve 126 thus extends from inside the chamber C to the inlet passage $P_I$, thereby extending across the upstream passage $P_{Ra}$. An inner-sleeve wall 126a of the sleeve 126 defines an annular sleeve seat 126b located proximate to the first sleeve end on the inside of the sleeve 126. Between the sleeve seat 126b and the second sleeve end, slot-like openings, referred to henceforth as sleeve windows 126c, extend from inside the sleeve 126 to outside thereof. Upon the sleeve 126 being received by the housing seat 118, the sleeve windows 126c longitudinally align with and circumferentially overlap the housing windows, such that fluid flowing through the flow path may flow through the sleeve windows 126c. Preferably, an overlap area of the sleeve windows 126c relative to the housing windows corresponds to at least a cross sectional area of the inlet passage $P_I$ or the outlet passage $P_O$, whichever is the lesser, such that the sleeve windows 126c are not a restrictor of the flow path. Here, as best seen in FIG. 4B, three similarly shaped and equally spaced apart sleeve windows 126c are provided, in what is merely one of numerous suitable configurations of the sleeve 126. The base 124 is fastened to the housing 110, in this case via the rim 114, so as to hold the sleeve 126, with the piston 122 therein, in place relative to the housing 110.

Figure 6:
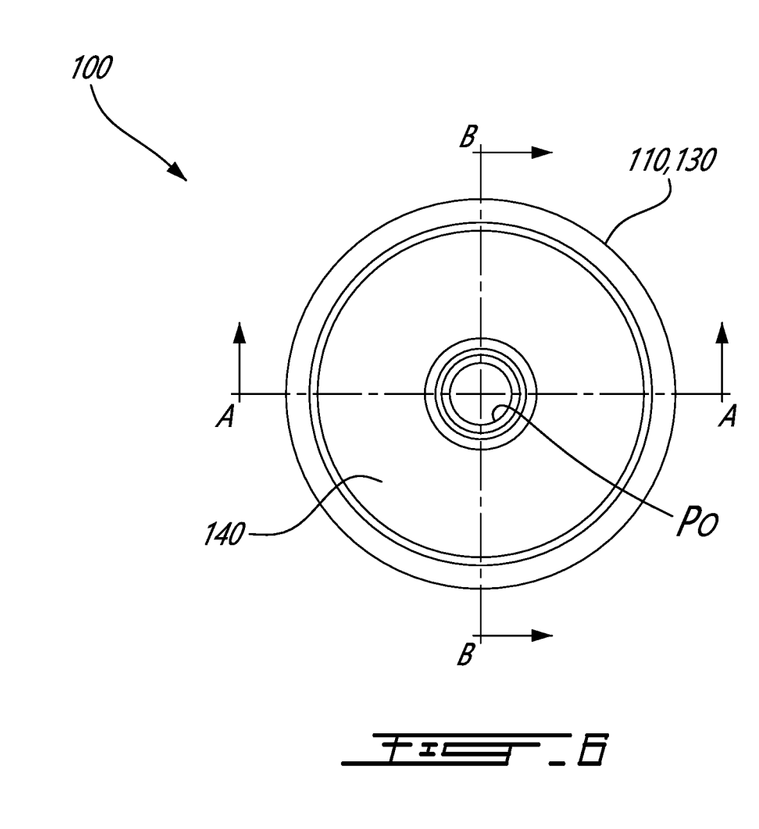
FIG. 6 is an elevation view of the valve of FIG. 3.
Figure 7A:
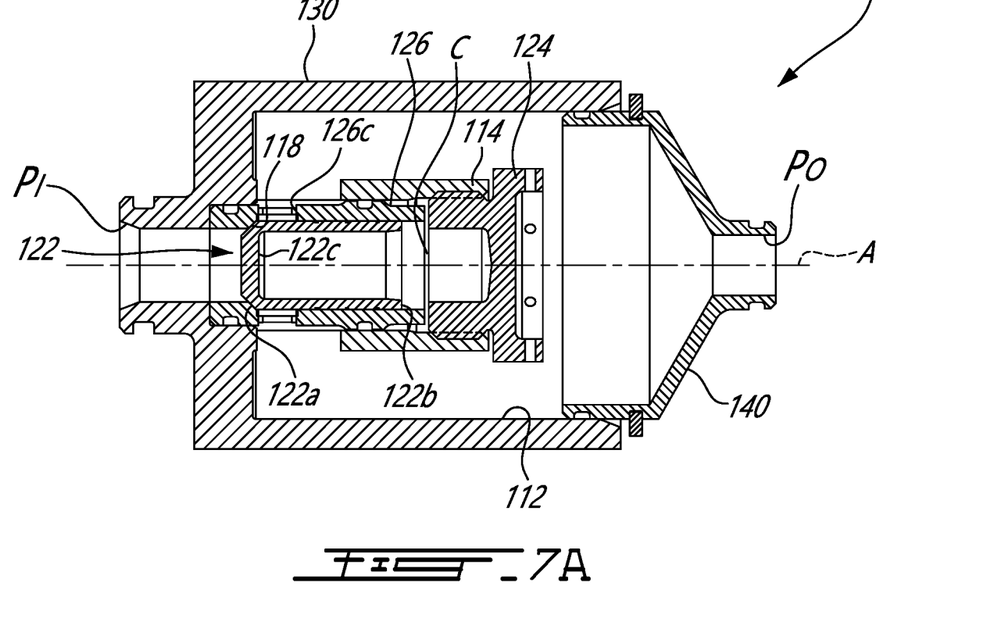
FIG. 7A is a cross sectional view of the valve of FIG. 3 taken along the line A-A of FIG. 6, with the valve shown in a closed valve position.
Figure 7B:
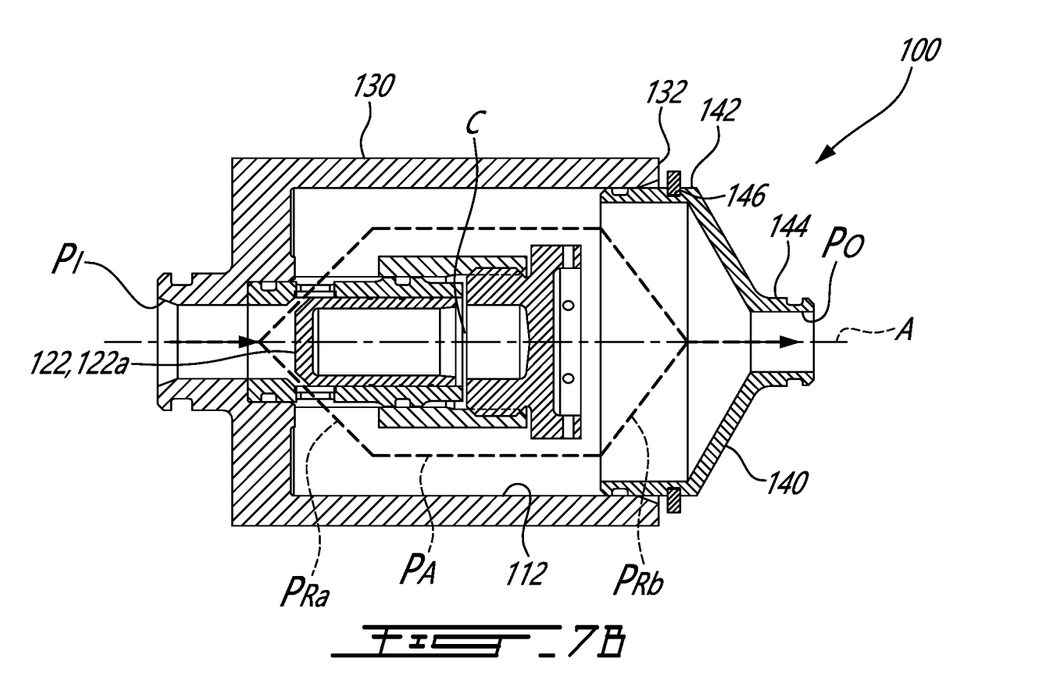
FIG. 7B is a cross sectional view of the valve of FIG. 3 taken along the line A-A of FIG. 6, with the valve shown in an open valve position.

Referring to FIGS. 6-7B, the piston 122 is movable relative to the housing 110 between a first valve position (FIG. 7A) in which the piston 122 obstructs the flow path at the upstream passage $P_{RA}$ and a second valve position (FIG. 7B) in which the piston 122 is at least partially clear of the flow path. The first and second valve positions may thus be respectively referred to as a closed position and an open position of the valve 100. In the first valve position, the piston 122 encroaches the upstream passage $P_{Ra}$. A first piston end 122a, or tip, of the piston 122 engages the sleeve seat 126b and blocks the flow path at the inlet passage $P_I$. Preferably, the first piston end 122a has a shape complementary to that of the sleeve seat 126b. A portion of the piston 122 proximate to the first piston end 122a blocks the flow path at the sleeve windows 126c. In some embodiments, the sleeve 126 is omitted, and the piston is slidably received by the rim 114. In such embodiments, the first piston end 122a engages the housing seat 118 when in the closed valve position so as to block the flow path at the inlet passage $P_I$.

The biasing means, in this case provided in the form of a spring having opposite ends respectively engaging the base 124 and a second piston end 122b of the piston 122, biases the piston 122 toward the first valve position under a certain biasing force. The biasing force is selected to be suitable for biasing the piston 122 in the first valve position upon any pressures exerted by fluids against the piston 122 being either balanced or absent, as the case may be during shutdown of the engine 10. The biasing force can be adjusted by any suitable way, such as by adjusting mechanical properties of the spring including a nominal length and/or stiffness of the spring. Conversely, this can be done by replacing the spring with another having a different length and/or stiffness, but also by way of a spacing means, such as one or more shims, inserted at one or both ends of the spring. In the depicted embodiment, the second piston end 122b defines a recess 122c, and the biasing means engages a bottom surface of the recess 122c. Proximate to the second piston end 122b and the base 124, a portion of the chamber C partially enclosed by the piston assembly 120 is in fluid communication with the reference port R. A reference fluid, which may be oil or a gas, is injected in the chamber C via the reference port R, thereby further urging the piston 122 toward the first position. Thus, to move the piston 122 from the first valve position to the second valve position, a force greater than the sum of those exerted by the spring and by the reference fluid against the second piston end 122b must be exerted against the first piston end 122a. Hence, the spring can be adjusted such that the piston 122 requires a pressure greater than that in effect at the reference port R by a predetermined amount in order to be moved from the first valve position to the second valve position. Increasing the stiffness of the spring can in some cases desirably lessen the effect of sudden pressure variations, such as a sudden pressure drop at the reference port R or a sudden pressure increase at the inlet passage $P_I$. In some embodiments, the biasing means is omitted, such that the piston 122 is biased toward the first valve position under the sole influence of the reference fluid, provided that a suitable pressure is in effect at the reference port R.

Whereas conventional referenced valves have their outlet located between their inlet and their pressure reference port, it should be noted that the flow path defining features described hereinabove allow circumvention of the reference port R by the flow path, such that the reference port R may be located between the inlet passage $P_I$ and the outlet passage $P_O$, i.e., at a location axially closer to the inlet passage $P_I$ than a location of the outlet passage $P_O$. This renders possible various spatial arrangements of the inlet passage $P_I$ and of the outlet passage $P_O$ relative to one another. For example, in this exemplary embodiment, the inlet passage $P_I$ and the outlet passage $P_O$ respectively extend along an inlet axis and an outlet axis that are collinear to the axis A. Stated otherwise, the inlet passage $P_I$, the chamber C and the outlet passage $P_O$ are concentric. In other embodiments, one or both of the inlet axis and the outlet axis may be at an angle to the axis A or transversely offset relative to the axis A.

Moreover, in this exemplary embodiment, the housing 110 is constructed of multiple pieces structured and arranged such that one such piece defining the chamber C is detachable from another such piece defining one of the upstream and downstream ends $100_a$, $100_b$ of the valve 100. In this particular arrangement, the housing 110 includes a body 130 having the upstream end $100_a$ of the valve 100, and a tubular member, referred to henceforth as a transfer tube 140, having the downstream end $100_b$ of the valve 100 and being detachable from the body 130. The transfer tube 140 extends along the outlet axis. The transfer tube 140 has a proximal tube portion 142 slidably received by the body 130 alongside the inner-housing wall 112, and a distal tube portion 144 defining the outlet passage $P_O$. In other embodiments, the body 130 is instead slidably received by the proximal tube portion 142. As it extends axially from the proximal tube portion 142 to the distal tube portion 144, the transfer tube 140 tapers and cooperates with the body 130 to define the downstream passage $P_{Rb}$. In other embodiments, the downstream passage $P_{Rb}$ is fully defined by the body 130, and the transfer tube 140 is located downstream thereof.

Figure 8A:
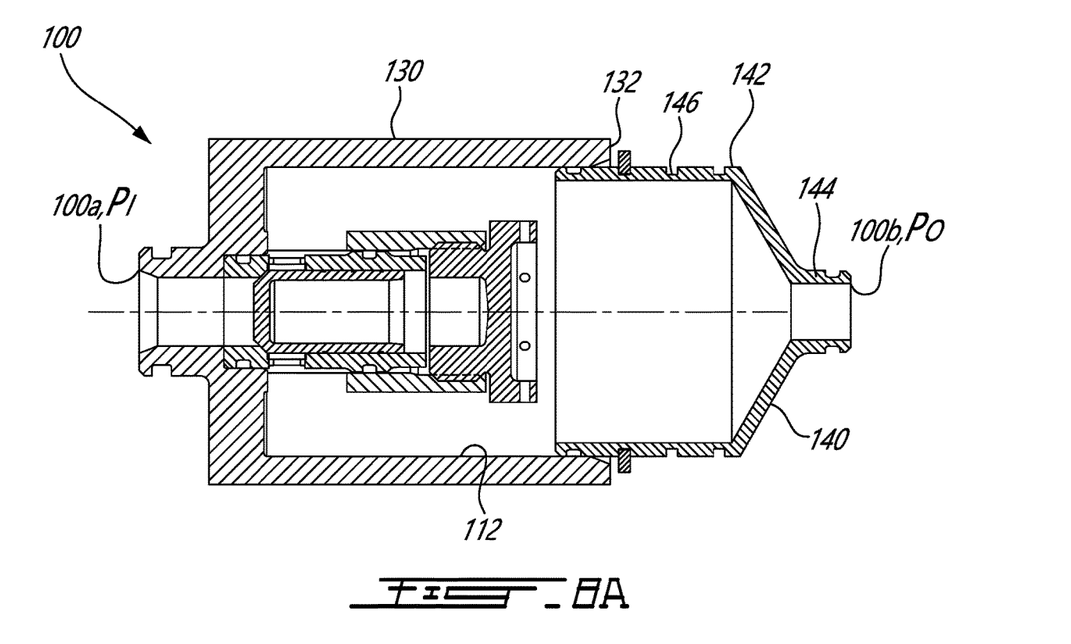
FIG. 8A is a cross sectional view of the valve according to an embodiment.
Figure 8B:
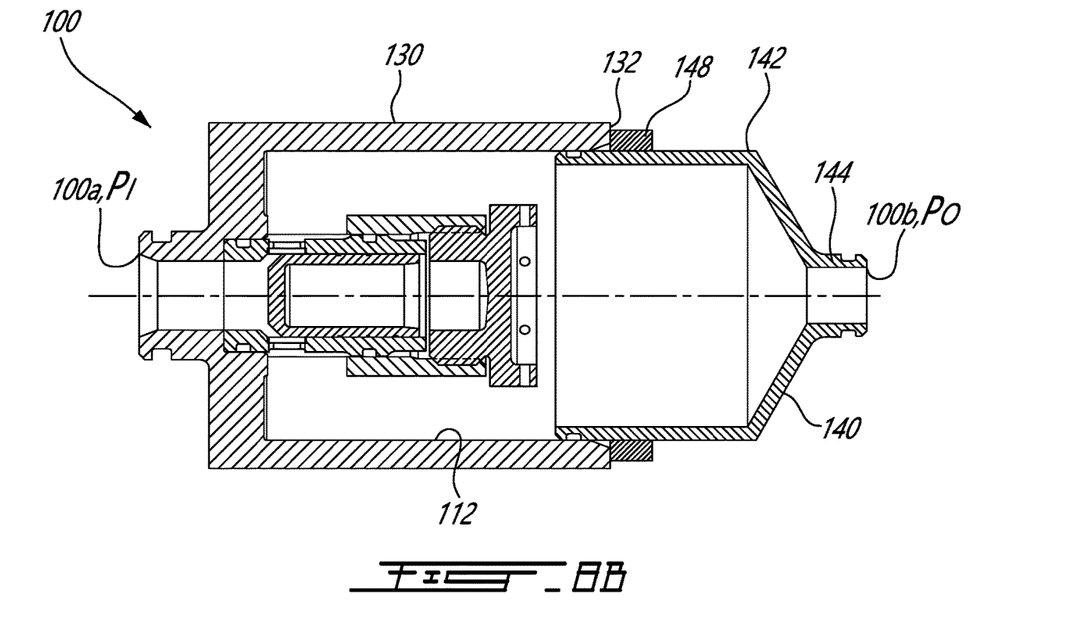
FIG. 8B is a cross sectional view of the valve according to an embodiment.
Figure 9A:
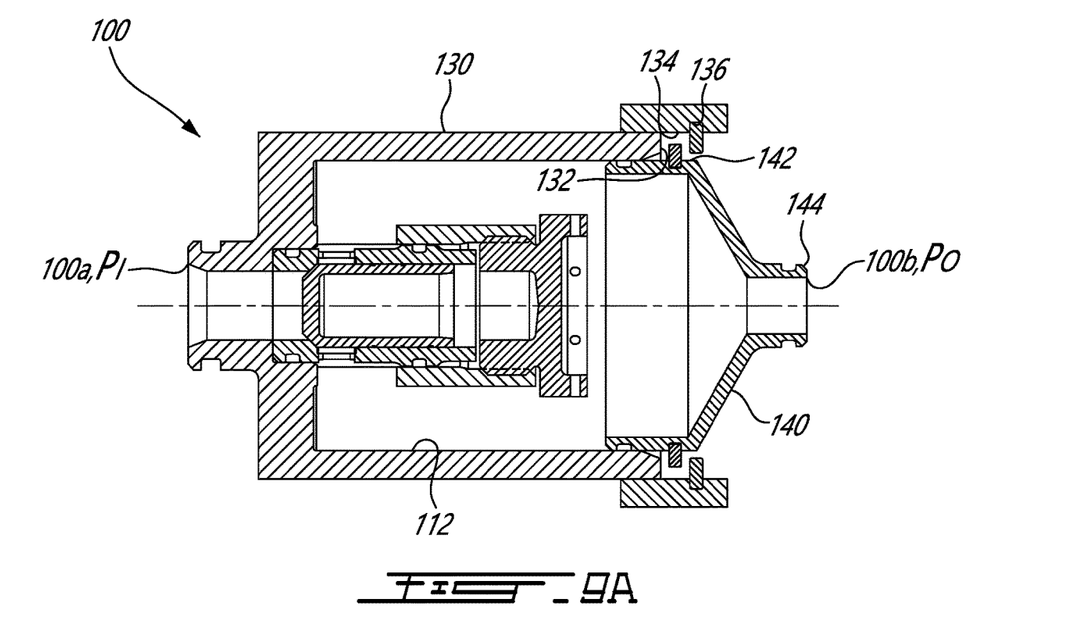
FIG. 9A is a cross sectional view of the valve according to an embodiment.
Figure 9B:
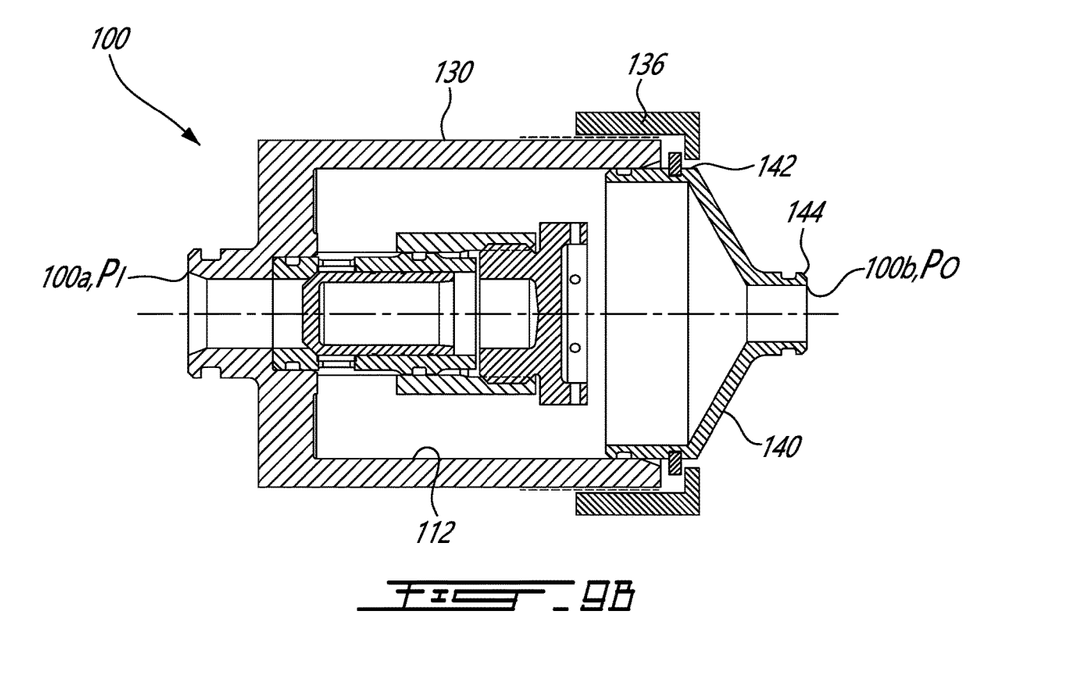
FIG. 9B is a cross sectional view of the valve according to an embodiment.

In some embodiments, an axial length of the valve 100 is selectively variable, and various means can be used to selectively position the transfer tube 140 relative to the body 130. For instance, referring to FIGS. 7A-7B, an annular body flange 132 of the body 130 extending radially outwardly relative to the inner-housing wall 112 can act as an abutment for limiting axial movement of the transfer tube 140 toward the upstream end $100_a$ of the valve 100. A C-clip (or other like fastener) engaged in an annular, radially outer tube groove 146 defined by the proximal tube portion 142 can abut the body flange 132, thereby stopping the transfer tube 140. As shown in FIG. 8A, in certain embodiments, the proximal tube portion 142 can define a plurality of tube grooves 146 spaced from one another, each allowing to selectively place the C-clip to stop the transfer tube 140 at a different offset relative to the body 130. Alternatively, as shown in FIG. 8B, the proximal tube portion 142 may be threadedly engaged with a nut 148 disposed therearound, and abut the body flange 132 via the nut 148. Conversely, axial movement of the transfer tube 140 away from the upstream end $100_a$ of the valve 100 can be limited by any one of several suitable means. For example, as shown in FIG. 9A, the body 130 may have an axially-extending wall 134 located radially outward of the flange 132 defining an annular, radially inner body groove 136 by which a C-clip (or other like fastener) may be received. The C-clip may engage the transfer tube 140 directly or indirectly via another C-clip fitted thereto. Alternatively, as shown in FIG. 9B, a flanged nut 138 threadedly engaged with the body 130 may be used to limit the outward movement of the transfer tube 140.

Figure 10A:
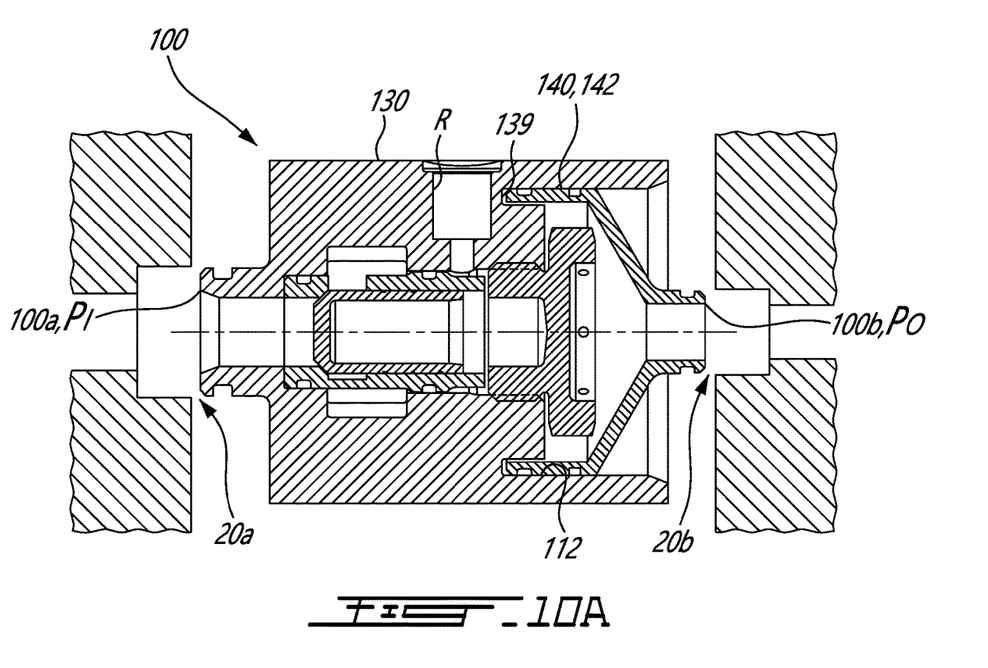
FIG. 10A is a cross sectional view of the valve of FIG. 3 taken along the line B-B of FIG. 6, with the valve shown in the closed valve position and in a retracted position.
Figure 10B:
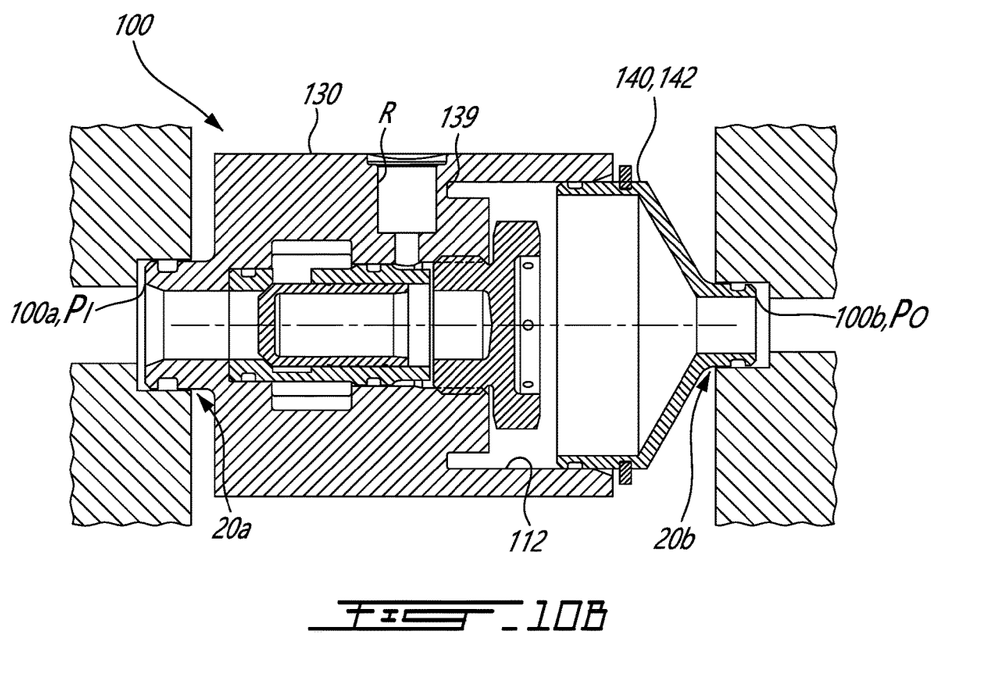
FIG. 10B is a cross sectional view of the valve of FIG. 3 taken along the line B-B of FIG. 6, with the valve shown in the closed valve position and in an extended position.

Referring to FIG. 10A, the valve 100 is shown in a retracted position, in which the transfer tube 140 is received by the body 130 such that the axial length, i.e., a distance between the upstream and downstream ends $100_a$, $100_b$ of the valve 100, is minimized. In the retracted position, the proximal tube portion 142 is received by an annular, axially-extending recess 139 defined by the body 130 at a location radially inward of the inner-housing wall 112 and axially inward the ribs 116. The recess 139 is also shown in FIG. 5A. In FIG. 10B, the valve 100 is shown in an extended position in which the transfer tube 140 is held relative to the body 130 such that the axial length, i.e., the distance between the upstream and downstream ends $100_a$, $100_b$ of the valve 100, is maximized. In this arrangement, the extended position corresponds to a distance between fixed ends of the fluid conduits 20a, 20b of the oil system 20. The valve 100 may be aligned with the fluid conduits 20a, 20b upon being in the retracted position and, once in alignment, be moved into the extended position to connect to the fluid conduits 20a, 20b. In embodiments, the body 130 is integral to a housing defining the fixed end of the fluid conduit 20a. In embodiments, the transfer tube 140 is integral to a housing defining the fixed end of the fluid conduit 20b.

Figure 11A:
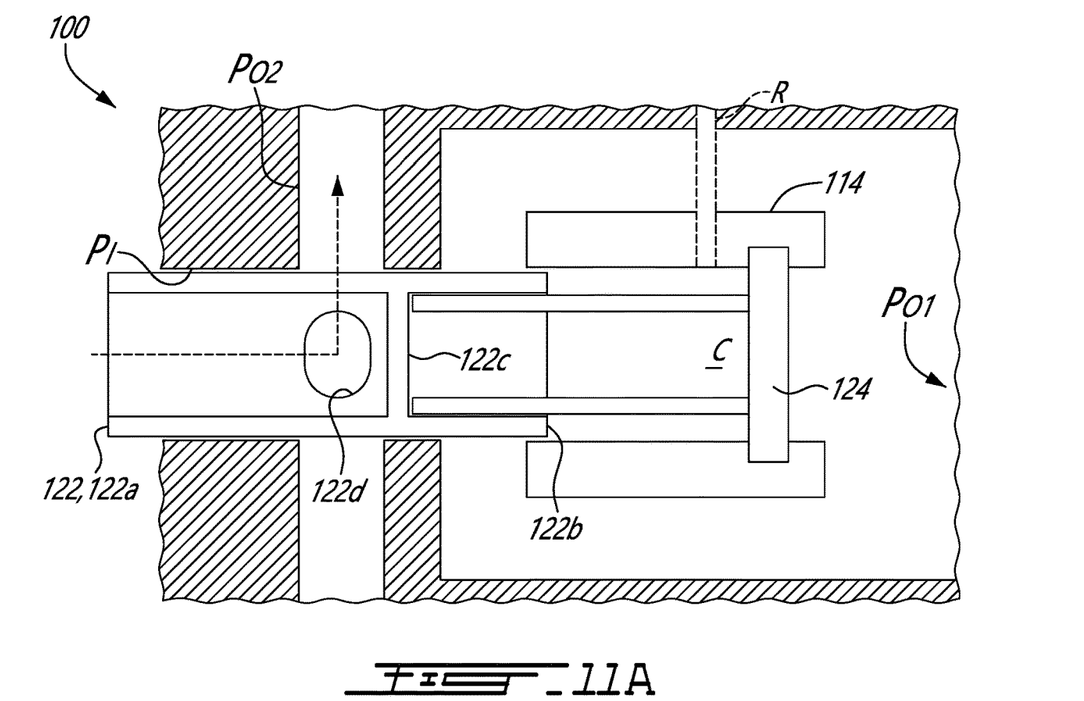
FIG. 11A is a schematic representation of a valve according to another embodiment, with the valve shown in a first valve position.
Figure 11B:
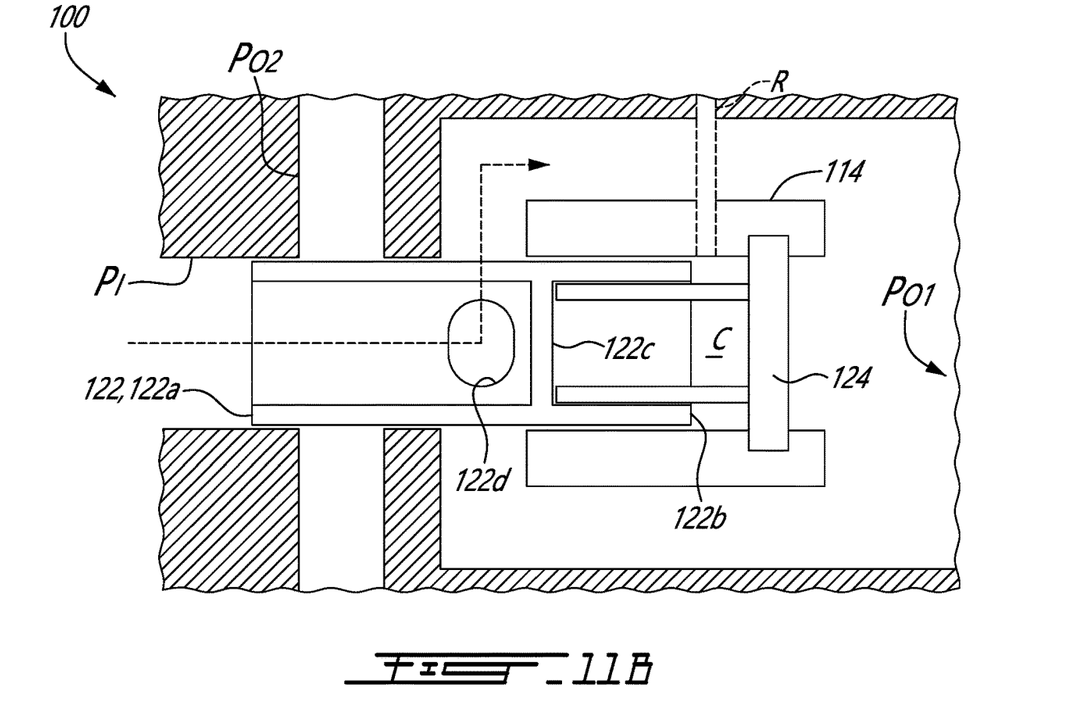
FIG. 11B is a schematic representation of the valve of FIG. 11A, with the valve shown in a second valve position.

With reference to FIGS. 11A and 11B, another embodiment of the present technology will now be described, in which the outlet passage $P_O$ is a first outlet passage $P_{O1}$, and the inlet passage $P_I$, the upstream passage $P_{Ra}$, the axial passage $P_A$, the downstream passage $P_{Rb}$ and the first outlet passage $P_O$ are in serial flow communication so as to define a first flow path through the valve 100. In this embodiment, the housing 110 defines a second outlet passage $P_{O2}$ located axially between the inlet passage $P_I$ and the reference port R. The second outlet passage $P_{O2}$ is in fluid communication with the inlet passage $P_I$, at a location upstream of the upstream passage $P_{Ra}$, defining a second flow path therewith through the valve 100. The second flow path may for example be upstream of the return line 60.

In this embodiment, the first piston end 122a is hollow. Stated otherwise, the piston 122 has a hollow piston portion extending from the first piston end 122a toward the second piston end 122b. The piston 122 defines a port 122d extending radially outwardly from inside the hollow piston portion to outside the piston 122. The piston 122 is movable relative to the housing 110 between a first valve position (FIG. 11A) and a second valve position (FIG. 11B). In the first valve position, the piston 122 at least partially obstructs the first flow path at the upstream passage $P_{RA}$, yet remains at least partially clear of the second flow path as the port 122d communicates with the the second outlet passage $P_{O2}$. The inlet passage $P_I$ is in fluid communication with the second outlet passage $P_{O2}$ via the hollow piston portion. In the second valve position, the piston 122 at least partially obstructs the second flow path yet remains at least partially clear of the first flow path as the port 122d communicates with the first outlet passage $P_{O1}$. The inlet passage $P_I$ is in fluid communication with the first outlet passage $P_{O1}$ via the hollow piston portion. Hence, fluid may flow through the valve 100 regardless of the position of the piston 122. In some embodiments, most but not all of the flow of fluid entering the valve 100 via the inlet passage $P_I$ exits the valve 100 via the second outlet passage $P_{O2}$ when the piston 122 is in the first valve position, and exits the valve 100 via the first outlet passage $P_{O1}$ when the piston 122 is in the second valve position. In some such embodiments, fluid exits the valve 100 at a given rate regardless of the position of the piston 122. In some other embodiments such as the one depicted in FIGS. 11A, 11B, the valve 100 is referred to as a bypass valve, i.e., 100% of the fluid entering the valve 100 via the inlet passage $P_I$ exits the valve 100 via the second outlet passage $P_{O2}$ when the piston 122 is in the first valve position, and exits the valve 100 via the first outlet passage $P_{O1}$ when the piston 122 is in the second valve position.

The embodiments described in this document provide non-limiting examples of possible implementations of the present technology. Upon review of the present disclosure, a person of ordinary skill in the art will recognize that changes may be made to the embodiments described herein without departing from the scope of the present technology. Indeed, various modifications could be implemented by a person of ordinary skill in the art in view of the present disclosure, which modifications would be within the scope of the present technology.

The invention claimed is:

1. A valve for use in a fluid system, the valve comprising: a housing including a body having an inlet connection port configured to be connected to a first fluid line and defining an inlet passage, and a transfer tube having an outlet connection port configured to be connected to a second fluid line and defining an outlet passage, the outlet passage axially spaced apart from the inlet passage relative to a longitudinal axis extending through the housing, and a pressure reference port located axially between the inlet passage and the outlet passage, the housing including: an inner-housing wall enclosing a housing cavity providing fluid communication between the inlet passage and the outlet passage; a rim in the housing cavity extending circumferentially about the longitudinal axis, the rim defining an axially-extending bypass passage circumscribed radially outwardly by the inner-housing wall and radially inwardly by the rim, a radially-extending upstream passage located axially between an upstream end of the housing cavity and the rim, and a radially-extending downstream passage located axially between the rim and a downstream end of the housing cavity, wherein the inlet passage, the upstream passage, the bypass passage, the downstream passage and the outlet passage are in serial flow communication so as to define a flow path through the valve; a chamber circumscribed radially outwardly by the rim, the chamber in fluid communication with the pressure reference port; a rib extending radially outwardly from the rim to the inner-housing wall, through the bypass passage; and a piston assembly received within the chamber, the piston assembly including a piston movable axially relative to the rim between a first valve position in which the piston obstructs the flow path at the upstream passage and a second valve position in which the piston is at least partially clear of the flow path to permit fluid flow along the flow path, the transfer tube defining a first surface, the body defining a second surface, the transfer tube slidably movable relative to the body via a sliding motion of the first surface relative to the second surface in an axial direction relative to a longitudinal axis of the housing and between an extended position and a retracted position to move the inlet connection port of the body relative to the outlet connection port of the transfer tube, an axial distance between the inlet connection port and the outlet connection port increasing from the retracted position to the extended position.

2. The fluid system of claim 1, wherein the inlet passage is disposed about the longitudinal axis.

3. The fluid system of claim 1, wherein the transfer tube is fastenable to the body so as to hold the outlet passage in place relative to the inlet passage.

4. The fluid system of claim 1, wherein the rib is one of a plurality of ribs circumferentially spaced apart from one another, the plurality of ribs partitioning the bypass passage into a plurality of axially-extending channels.

5. The fluid system of claim 4, wherein the channels have a cylindrical shape.

6. The fluid system of claim 1, wherein the pressure reference port is in fluid communication between a portion of the chamber partially enclosed by the piston assembly and outside the valve.

7. The fluid system of claim 1, wherein the outlet passage is a first outlet passage, the housing defining a second outlet passage in fluid communication with the inlet passage, the second outlet passage located closer to the inlet passage than the pressure reference port.

8. The fluid system of claim 7, wherein when the piston is in the first valve position, the piston obstructs the second outlet passage and when the piston is in the second valve position, the piston is at least partially clear of the second outlet passage.

9. The fluid system of claim 8, wherein the piston has a first piston end proximate to the inlet passage, a second piston end opposite the first piston end, and a hollow piston portion extending from the first piston end toward the second piston end, the piston defining a port extending radially outwardly from inside the hollow piston portion to outside the hollow piston portion, the inlet passage in fluid communication with inside the hollow piston portion via the first piston end upon the piston being either in the first valve position or in the second valve position, the second outlet passage being in fluid communication with the inlet passage via the port upon the piston being in the first valve position and the first outlet passage being in fluid communication with the inlet passage via the port upon the piston being in the second valve position.

10. A fluid system for a gas turbine engine, the fluid system comprising: a reservoir for receiving a fluid; a valve downstream of the reservoir and having a valve inlet in fluid communication therewith, the valve including: a housing having a body and a transfer tube, the housing including: an inlet passage defined by an inlet connection port of the body and defining the valve inlet, an outlet passage defined by an outlet connection port of the transfer tube and axially spaced from the inlet connection port relative to a longitudinal axis extending through the housing, and a pressure reference port located axially between the inlet passage and the inlet passage, the outlet passage defining a valve outlet; an axially-extending bypass passage radially outward of the longitudinal axis; a radially-extending upstream passage in fluid communication between the inlet passage and an upstream end of the bypass passage; a radially-extending downstream passage in fluid communication between a downstream end of the bypass passage and the outlet passage, wherein the inlet passage, the upstream passage, the bypass passage, the downstream passage and the outlet passage are in serial flow communication so as to define a flow path through the valve, and a chamber extending axially between the upstream passage and the downstream passage, the chamber in fluid communication with the pressure reference port; a piston assembly received by the chamber, the piston assembly including a piston movable axially relative to the chamber between a first valve position in which the piston obstructs the flow path at the upstream passage and a second valve position in which the piston is at least partially clear of the flow path to permit fluid flow along the flow path, the transfer tube defining a first surface, the body defining a second surface, the transfer tube slidably movable relative to the body via a sliding motion of the first surface relative to the second surface in an axial direction relative to a longitudinal axis of the housing and between an extended position and a retracted position to move the inlet connection port of the body relative to the outlet connection port of the transfer tube, an axial distance between the inlet connection port and the outlet connection port increasing from the retracted position to the extended position; and a wet cavity downstream of the valve and in fluid flow communication with the valve outlet.

11. The fluid system of claim 10, further comprising a pump upstream of the valve inlet and a pressure reference in fluid flow communication with the pressure reference port.

12. The fluid system of claim 10, wherein the pressure reference port provides fluid communication between a portion of the chamber partially enclosed by the piston assembly and a region outside the valve.

13. The fluid system of claim 10, wherein the outlet passage is a first outlet passage, the housing defining a second outlet passage in fluid communication with the inlet passage, the second outlet passage located closer to the inlet passage than the pressure reference port.

14. The fluid system of claim 13, further comprising a return line downstream of the second outlet passage, the return line in fluid communication with the reservoir.

15. The fluid system of claim 10, wherein the housing includes a body defining the inlet passage and the pressure reference port, and a transfer tube defining the outlet passage, the transfer tube slidably received by the body.

\* \* \* \* \*